March 11, 1941.  G. GERALDSON  2,234,923
POWER LIFT
Filed Dec. 30, 1938  2 Sheets-Sheet 1
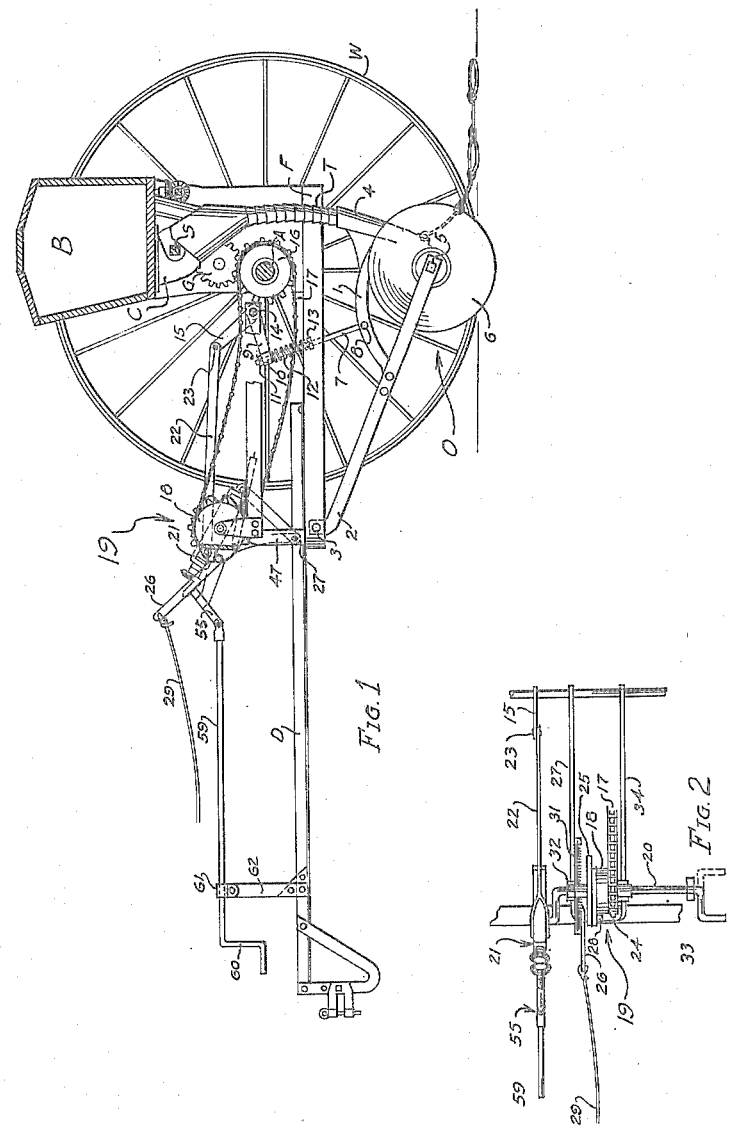
INVENTOR.
Gerald Geraldson
BY
Emerson B Donnell
ATTORNEY

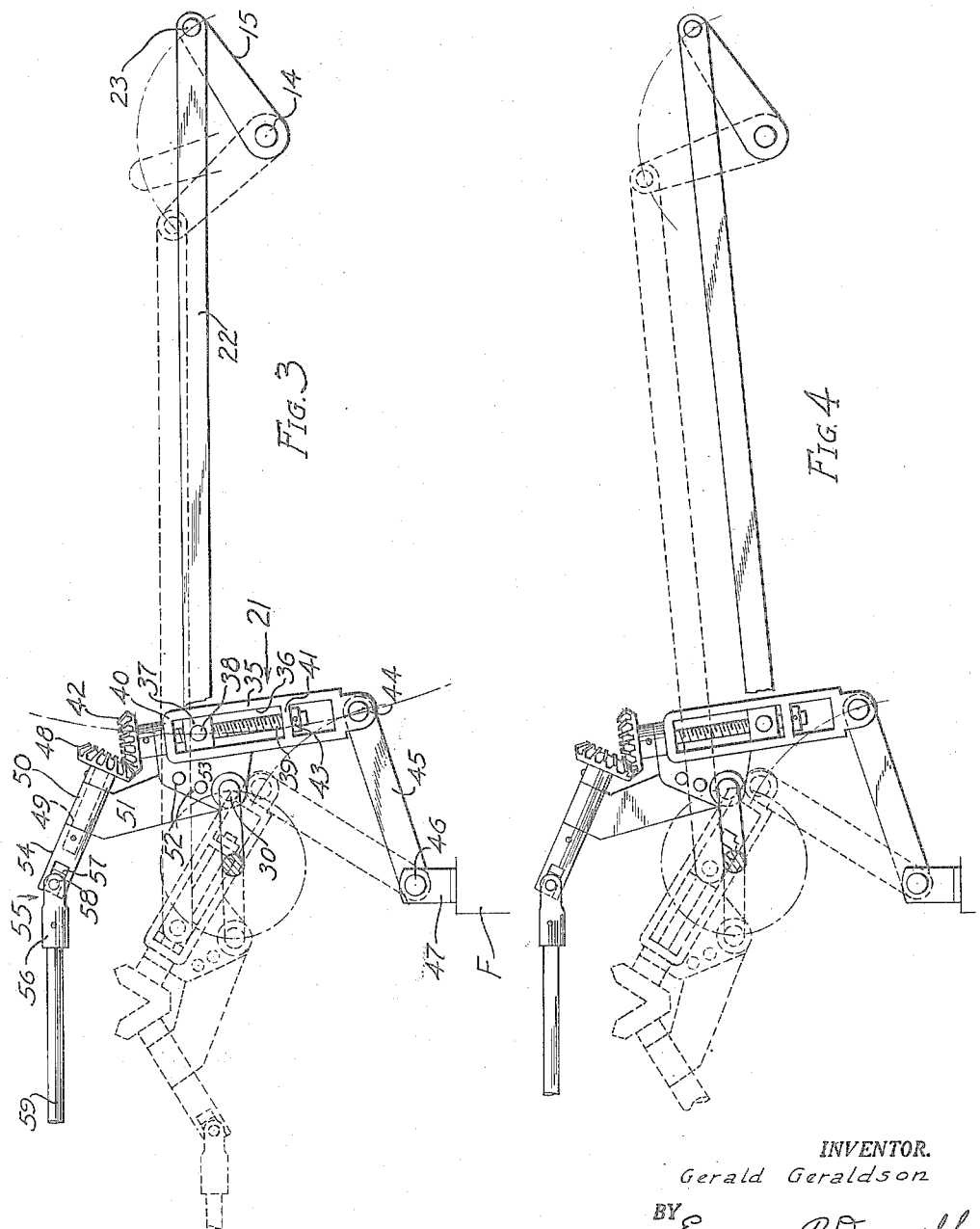

Patented Mar. 11, 1941

2,234,923

UNITED STATES PATENT OFFICE 2,234,923

POWER LIFT

Gerald Geraldson, Rockford, Ill., assignor to J. I. Case Company, Racine, Wis., a corporation Application December 30, 1938, Serial No. 248,371

16 Claims. (Cl. 97—244)

The present invention relates to power lift devices, and particularly to such as are applicable to grain drills.

An object of the invention is to generally improve the construction and operation of devices of this class.

A further object is to provide such a device which is adjustable from a remote point, such, for example, as a tractor drawing the drill.

Further objects are to provide an improved arrangement of parts for securing a variable depth of planting while maintaining a fixed transport position of furrow openers; such an arrangement in which the angular movement of certain parts is limited sufficiently not to interfere with remote control of the depth adjustment; and expedients for facilitating the realization of these objects.

Further objects and advantages will be apparent from the following description and accompanying drawings in which:

Figure 1 is a side elevation of a grain drill embodying the invention, parts being removed to show the novel features to better advantage.

Fig. 2 is a plan view of certain mechanism indicated in Fig. 1.

Fig. 3 is an enlarged side elevation of certain mechanism indicated in Fig. 1.

Fig. 4 is a similar view showing the parts in a different adjustment.

As seen in Fig. 1, the invention is embodied in a grain drill of suitable or well-known form including a frame F supported by wheels such as W mounted on or driving an axle A, the frame being provided with a draw-bar D by which the device may be drawn by a tractor or other suitable source of power. Axle A drives, through suitable gearing or the like generally designated as G a feed shaft S extending through a plurality of feed cups C carried by a seed box B, the seeds dropping through flexible tubes T to the furrow openers O, all of the above being of the usual or well-known construction, the present invention concerning itself with power actuated means for lifting the openers O to transport position, clear of the ground, and for introducing them into the ground predetermined distances, as will appear.

Since the furrow openers O are all substantially identical, it will be sufficient to describe one. Each opener includes an arch member 1 fixed with a drag bar 2 pivoted at 3 to frame F, the arch being also fixed with a boot 4, and drag bar 2 carrying a bearing 5 at which is journaled a disk 6. The assembly including the arch, drag-bar, boot and disk may be raised and lowered, pivoting about point 3, for planting different depths or for transportation, and, for controlling the positions of the same, a rod 7 is pivoted to each arch 1, or other convenient part on the assembly, as 8 and connected to an arm 9 as by a slide block 10, pivoted to the arm, the rod having a head 11 above the block, and a spring 12 acting between the slide-block and a collar 13 fixed on the rod to urge the latter, and accordingly the opener assembly, to the lowered positions determined by the setting of the arm 9.

Upper positioning of the parts is of course determined positively by contact of head 11 with block 10.

Arm 9 is fixed with a rock shaft 14 journaled on a portion of frame F and extending across a plurality of openers O, there being an arm 9 for each opener, as will be apparent.

A lever 15 fixed with the rock shaft controls the position thereof, and accordingly governs the action of the arms and openers.

Arm 15 is actuated by power as follows: Axle A, which is rotated from wheels W drives, through a sprocket 16 or the like, a chain or flexible member 17, which extends to and actuates the movable member 18, Fig. 2, of a half-revolution, or cycle-clutch generally designated as 19, the clutch actuating a crank-shaft 20 which operates, through an adjusting member or yoke generally designated as 21, a link 22 pivotally connected to lever 15 at 23.

Sprocket 16 may be fixed in any suitable manner with axle A, and chain 17 engages and drives a sprocket 24 fixed with or forming part of rotary member 18 of cycle-clutch 19, the rotary member being journaled on crank-shaft 20 and operating whenever the drill is in motion. Member 18 may be drivingly connected with a normally stationary member 25 through internal mechanism of well-known type not shown, member 25 being fixed with crank-shaft 20 whereby the crankshaft is rotated with member 25 when the latter is engaged with rotary member 18. A trip lever 26 is pivoted for swinging movement on a member 27 forming a part of frame F and has a roll 28 coacting with member 25 in the usual manner whereby, when trip lever 26 is pulled forward momentarily, as by a rope or the like 29, clutch member 25 will engage with member 18 for one half revolution and automatically disengage, turning crankshaft 20 from the full-line position to the dotted line position indicated at 30, and locking it against movement. Lever 26 is retracted by suitable means such as a spring 31 anchored to some suitable portion of the implement such as member 27.

Crankshaft 20 is carried in bearings 32 and 33 supported by the frame and may be also supported near sprocket 24 by frame portion 27 and a portion 34 also carried by the frame.

For drills with a large number of furrow openers crank-shaft 20 may have a crank at either end as shown in Fig. 2, while with a smaller number of openers a single crank will be sufficient. In any event, the two cranks and their connected mechanisms being substantially identical, it is thought to be sufficient to describe one. Figs. 3 and 4 show the details of the raising and adjusting mechanism, the parts being shown in the "up" or transport position of the openers in full lines, and in the "down" position in dotted lines, Fig. 3 showing the adjustment for deep planting and Fig. 4 that for shallow planting.

Adjusting member 21 may be of various forms, but in the present instance takes the form of a yoke 35 having a slide-way 36 for guiding a slide block 37, to which above mentioned link 22 is pivoted by means of a pin 38, the link being bifurcated if desired, as shown in Fig. 2, the slideway, in the "up" position of the furrow openers being disposed generally in the direction of the circumference of a circle having point 23 as a center (in the "up" position of the parts) and a radius equal to the length of link 22.

Assuming yoke 35 fixed in this position, movement of the slide block in slideway 36 will have very little effect on the position of point 23, and for the purposes here involved may be said not to affect such position.

A screw 39 extends lengthwise of slide-way 36, engaging block 37, rotation of which screw adjusts the block, and accordingly the pivot point of the link 22 in the direction of the length of the screw. The screw is journaled in the upper end 40 of the yoke and in a cross member, brace or the like 41 defining the lower end of the slideway. The screw passes through the slide-block and is threadedly engaged therewith, and is prevented from moving axially by a gear 42 and a collar or the like 43. Other mechanical expedients are regarded as equivalent.

Yoke 35 in the present instance is journaled at a point near but slightly displaced from its upper end on one of crank pins 30 and at its lower end it is pivoted by means of a pin 44 to a link or brace 45, which is in turn pivoted by means of a pin or the like 46 to a bar 47 constituting part of frame F. This linkage gives a novel action by which a sufficient movement of link 22 is obtained without excessive angular movement of yoke 35, the latter facilitating the extension of the adjustment of screw 39 to a remote point, as will appear hereinafter.

Gear 42 meshes with a gear 48 carried by a short shaft 49 journaled in a bearing 50 forming part of a bracket 51 suitably fixed with yoke 35 by rivets or the like 52—52 engaged in a web portion 53 extended from the yoke, although other means of fastening the bracket are contemplated as equivalent. Shaft 49 carries a fork member 54 of a universal joint generally designated as 55, to which is connected in the usual or a suitable manner a fork member 56, the usual block 57 and pintles 58 being interposed between the forks.

Fork 56 is connected to a shaft or rod 59 extending to any desired point such, for example, as the tractor drawing the drill, and it may be provided with a crank 60, Fig. 1, or other suitable means for actuating the rod. Rod 59 may be supported near crank 60 by means of a bearing 61 pivoted to a standard 62 at 63, the standard being carried by drawbar D, or on the tractor (not shown) within the contemplation of the invention, sufficient flexibility in the mounting of the bearing being allowed for movements of the universal joint 55 upon changing from one to another position of the openers.

The operation of the device is thought to be apparent from the above description, but it is pointed out that the "up" position of the furrow openers places yoke 35 and slide-way 36 in a position extending substantially in the path of swinging movement of the end of link 22 remote from pivot 23 so that adjustment of block 37 by rotation of screw 39 affects arm 15, and accordingly the furrow openers O substantially not at all. Conversely, regardless of the position of the block in the slideway, the arm and its connected parts will always be in the same position when adjusting element 21 is in the "up" position shown in full lines in Figs. 3 and 4.

On the other hand, when adjusting element 21 is in the "down" position, as shown in Fig. 1 and in dotted lines in Figs. 3 and 4, adjustment of block 37 will have a marked effect on the position of pivot 23, and accordingly of the furrow openers, since the slide-way extends, under these conditions, not approximately at right angles to the link, but at an acute angle thereto, or, in other words, so that movement of the block will have a component in the direction of the length of the link.

Adjustment of the block under these conditions will accordingly cause raising or lowering of the openers, or, conversely, a change in the position of the block will cause the openers to descend to a different point upon the next actuation of the adjusting element 21 into the dotted position of Figs. 3 and 4.

The angular movement of the element necessary to effect the raising or lowering of the openers is well within the range of the universal joint 55, thus avoiding complication in the means for extending the adjustment of the screw to a remote point, and this is brought about in part by the connection of the pivot 44 of the adjusting element to frame member 47 by means of the swinging link 45. Thus as the element moves from the full-line to the dotted position in Fig. 3, for example, the point 44 moves first upwardly and then generally in the direction of link 22 so that a given amount of lengthwise movement is imparted to link 22 with less angular movement of element 21 during the latter part of the movement than during the earlier part thereof.

The above being a complete description of an illustrative embodiment of the invention, what is claimed as new and desired to be secured by Letters Patent of the United States is:

1. In a power lift for a planting device having a furrow opener the combination of a crank, an adjusting element pivoted to the crank for oscillatory movement upon rotation thereof, a screw extending lengthwise of the adjusting element, a link pivotally connected to the element at a point which is adjustable by rotation of the screw, said link extending substantially normal to said element in one position thereof and connected to maintain the furrow opener in inoperative position, said adjusting element being movable by rotation of said crank into a position oblique to said link for actuating the link to move the opener into operative position, and means for adjusting said screw for changing the amount of movement given to said link by the last mentioned movement of the adjusting element whereby to change the depth of operation of said opener without changing its position when inoperative.

2. In a grain drill a plurality of furrow openers, lifting means for the openers, and actuating means for the lifting means including a part revolution clutch, a member pivotally connected to the clutch for orbital movement at one end upon rotation of the clutch, said member being connected at its other end for arcuate movement, a link pivotally connected to the member between the ends thereof for adjustment to various positions thereon, and connections from said link to said raising means.

3. In a power lift for a grain drill having a frame, wheels, and furrow openers, a cycle clutch, means for rotating the cycle clutch during forward movement of the grain drill, a crank element actuated by the cycle clutch, an adjusting element connected to the crank for oscillation from one position to another upon rotation of the crank by the cycle clutch, a link pivoted to said element at points adjustable along the length thereof and connected to said furrow openers for holding them in an inoperative position when said element is substantially normal to said link, and in an operative position when said element is positioned by said cycle clutch at an acute angle to said link.

4. In a grain drill a plurality of furrow openers, a rock shaft, means connecting the rock shaft with the openers and arranged for lifting the openers upon rocking of the rock shaft, and means for rocking the rock shaft including a part revolution clutch, a yoke member pivotally connected to the clutch for orbital movement at one end upon rotation of the clutch, said yoke being connected at its other end for arcuate movement, a link pivotally connected to the yoke between the ends for adjustment to various positions thereon, and an arm on the rock shaft and pivotally connected to the link.

5. In a grain drill a plurality of furrow openers, a rock shaft, means connecting the rock shaft with the openers and arranged for lifting the openers upon rocking of the rock shaft, the means for rocking the rock shaft including an arm fixed with the rock shaft and a link extending from the arm and pivotally connected thereto, an adjusting element extending in one position substantially in the path of pivotal movement of the link about its pivotal connection to the arm, a pivotal connection between the link and the adjusting element, and adjustable in position along the length of said element whereby to have substantially no effect upon the position of said arm and rock shaft, due to said adjustment, said position of said adjusting element causing the inoperative positioning of the furrow openers, said adjusting element being movably mounted, and means for alternatively shifting it into a position inclined to said link whereby to move said arm and said rock shaft to extend the furrow openers into the ground.

6. In a power lift for a grain drill including a frame, wheels, and furrow openers, raising means for the furrow openers, a cycle clutch, means for rotating the cycle clutch during forward movement of the grain drill, a crank element actuated by the cycle clutch, an adjusting element connected to the crank for movement from one position to another upon rotation of the crank by the cycle clutch, said element being pivoted to said crank for movement therewith, and a brace pivoted to said element at a point spaced from the connection of said element with said crank, said brace being pivotally connected with said frame, a link pivoted to said element at points adjustable along the length thereof and connected to said furrow openers for holding them in an inoperative position when said element is substantially normal to said link, and in an operative position when said element is positioned by said cycle clutch at an acute angle to said link.

7. In a power lift for a grain drill including a frame, wheels and furrow openers, raising means for the furrow openers, a cycle clutch, means for rotating the cycle clutch during forward movement of the grain drill, a crank element actuated by the cycle clutch, an adjusting element connected to the crank for movement from one position to another upon rotation of the crank by the cycle clutch, said element being pivoted to said crank for movement therewith, a brace pivoted to said element at a point spaced from the connection of said element with said crank and pivotally anchored to said frame, a screw associated with and extending lengthwise of said adjusting element, a link pivotally connected to the screw and adjustable along the length thereof by rotation of the screw, said link being connected to said furrow openers for holding them in an inoperative position when said element is substantially normal to said link, and in an operative position when said element is positioned by said cycle clutch at an acute angle to said link.

8. In a power lift for a grain drill including a frame, wheels and furrow openers, raising means for the furrow openers, a cycle clutch, means for rotating the cycle clutch during forward movement of the grain drill, a crank element actuated by the cycle clutch, an adjusting element connected to the crank for movement from one position to another upon rotation of the crank by the cycle clutch, said element being pivoted at one point to said crank for orbital movement therewith, a brace pivoted to said element at a point spaced from its connection with said crank and pivotally anchored to said frame, a link pivotally connected to said adjusting element and adjustable along the length thereof, said link being connected to said furrow openers for holding them in an inoperative position when said element is substantially normal to said link, and said crank and said brace being positioned and related to said adjusting element so that said element in moving from said position normal to said link will move in a path having a component generally in the direction of the length of said adjusting element and a component generally in the direction of said link.

9. In a power lift for a grain drill including a frame, wheels and furrow openers, raising means for the furrow openers, a cycle clutch, means for rotating the cycle clutch during forward movement of the grain drill, a crank element actuated by the cycle clutch, an adjusting element connected to the crank for movement from one position to another upon rotation of the crank by the cycle clutch, said element being pivoted at one point to said crank for orbital movement therewith, a brace pivoted to said element at a point spaced from its connection with said crank and pivotally anchored to said frame, a screw associated with and extending lengthwise of said adjusting element, a link pivotally connected to the screw and adjustable along the length thereof by rotation of the screw, said link being connected to said furrow openers for holding them in an inoperative position when said element is substantially normal to said link, and said crank and said brace being positioned and related to said adjusting element so that said element in moving from such position normal to said link will move in a path having a component lengthwise of said screw, and a flexible shaft extending from said screw to a remote point.

10. In a power lift for a grain drill having a frame, wheels, and furrow openers, a cycle clutch, means for rotating the cycle clutch during the forward movement of the grain drill, an adjusting element, means for oscillating said element from rotation of said cycle clutch and means including a screw associated with said adjusting element and extending lengthwise thereof, a link pivotally connected to the screw and adjustable lengthwise of said element by rotation of the screw said link being connected to said furrow openers for holding them in an inoperative position when said element is substantially normal to said link.

11. In a power lift for a grain drill having a frame, wheels, and furrow openers, a cycle clutch, means for rotating the cycle clutch during the forward movement of the grain drill, an adjusting element, means for oscillating said element from rotation of said cycle clutch, a screw associated with said adjusting element and extending lengthwise thereof, and means for raising said furrow openers including a link pivotally connected to the screw and adjustable lengthwise of said element by rotation of the screw, and means for rotating said screw extended to a remote point.

12. In a power lift for a grain drill having a frame, wheels, and furrow openers, a cycle clutch, means for rotating the cycle clutch during the forward movement of the grain drill, an adjusting element, means for oscillating said element from rotation of said cycle clutch, a screw associated with said adjusting element and extending lengthwise thereof, and means for raising said furrow openers including a link pivotally connected to the screw and adjustable lengthwise of said element by rotation of the screw and a jointed shaft connected to said screw for rotation thereof and extended to a remote point.

13. In a power lift for a grain drill having a frame, wheels, and furrow openers, a cycle clutch, means for rotating the cycle clutch during the forward movement of the grain drill, an adjusting element, means for oscillating said element from rotation of said cycle clutch, a screw associated with said adjusting element and extending lengthwise thereof, a link pivotally connected to the screw and adjustable lengthwise of said element by rotation of the screw, a gear on said screw, a jointed shaft extended to a remote point, a gear on said shaft positioned to engage the gear on said screw for control of said screw, said link being connected to said furrow openers for holding them in an inoperative position when said element is substantially normal to said link.

14. In a power lift for an agricultural implement including a frame, wheels, and an earth engaging element, raising means for the earth engaging element, a cycle clutch, means for rotating the cycle clutch during forward movement of the implement, a crank element actuated by the cycle clutch, an adjusting element connected to the crank for movement from one position to another upon rotation of the crank by the cycle clutch, said adjusting element being pivoted to said crank for movement therewith, a brace pivoted to said element at a point spaced from the connection of said element with said crank and pivotally anchored to said frame, a screw associated with and extending lengthwise of said adjusting element, a link pivotally connected to the adjusting element and adjustable along the length thereof by rotation of the screw, said link being connected to said earth engaging element for holding it in an inoperative position when said adjusting element is substantially normal to said link, and in an operative position when said element is positioned by said cycle clutch at an acute angle to said link, and means extending to a remote point for rotating said screw for adjusting said link along the length of said adjusting element.

15. In a power lift for an agricultural implement including a frame, wheels, and an earth engaging element, raising means for the earth engaging element including a cycle clutch, means for rotating the cycle clutch during forward movement of the implement, an adjusting element, connecting means between said adjusting element and said cycle clutch for movement of said adjusting element from one position to another upon rotation of the cycle clutch, said adjusting element being so connected to said frame as to move in a path having a component in the direction of its length when moving from one position determined by said cycle clutch to another position determined by said cycle clutch, a link pivotally connected to the adjusting element and adjustable along the length thereof, said link being connected to said earth engaging element for holding it in an inoperative position when said adjusting element is in one position determined by said cycle clutch and in an operative position when said element is positioned by said cycle clutch in the opposite position, and means extending to a remote point for adjusting said link lengthwise of said adjusting element.

16. In a power lift for an agricultural implement including a frame, wheels, and an earth engaging element, raising means for the earth engaging element including a cycle clutch, means for rotating the cycle clutch during forward movement of the implement, an adjusting element, connecting means between said adjusting element and said cycle clutch for movement of said adjusting element from one position to another upon rotation of the cycle clutch, said adjusting element being so connected to said frame as to move in a path having a component in the direction of its length when moving from one position determined by said cycle clutch to another position determined by said cycle clutch, a link pivotally connected to the adjusting element and adjustable along the length thereof, said link being connected to said earth engaging element for holding it in an inoperative position when said adjusting element is in one position determined by said cycle clutch and in an operative position when said element is positioned by said cycle clutch in the opposite position.

GERALD GERALDSON.